United States Patent [19]

Martens et al.

[11] Patent Number: 4,586,092
[45] Date of Patent: Apr. 29, 1986

[54] THERMO-MAGNETO-OPTICAL MEMORY DEVICE AND RECORDING MEDIUM THEREFOR

[75] Inventors: Jan W. D. Martens; Winfried L. Peeters, both of Eindhoven, Netherlands

[73] Assignee: U.S. Philips Corporation, New York, N.Y.

[21] Appl. No.: 780,235

[22] Filed: Sep. 25, 1985

Related U.S. Application Data

[63] Continuation of Ser. No. 443,007, Nov. 19, 1982, abandoned.

[30] Foreign Application Priority Data

Sep. 27, 1982 [NL] Netherlands .................. 8203725

[51] Int. Cl.⁴ ............................................. G11B 11/00
[52] U.S. Cl. ..................... 360/59; 360/114; 369/13; 365/122
[58] Field of Search ............... 360/59, 114; 369/13; 365/122

[56] References Cited

U.S. PATENT DOCUMENTS

| | | | |
|---|---|---|---|
| 3,174,140 | 3/1965 | Hagopian et al. | 360/114 |
| 3,224,333 | 12/1965 | Kolk et al. | 360/114 |
| 3,472,575 | 10/1969 | Hunt | 360/114 X |
| 3,626,394 | 12/1971 | Nelson et al. | 360/114 |
| 3,636,535 | 1/1972 | Cushner et al. | 360/114 X |
| 3,648,257 | 3/1972 | Wiese, Jr. et al. | 360/59 |
| 3,683,405 | 8/1972 | Duck | 360/59 X |
| 3,778,791 | 12/1973 | Lewicki et al. | 360/59 X |
| 3,838,450 | 9/1974 | Bongers et al. | 360/59 X |
| 3,838,907 | 10/1974 | Enz | 365/122 X |
| 3,928,870 | 12/1975 | Ahren Kiel et al. | 360/59 |
| 4,466,035 | 8/1984 | Connell et al. | 365/122 |
| 4,473,829 | 9/1984 | Schouhamer et al. | 346/1.1 |

Primary Examiner—Robert L. Richardson
Attorney, Agent, or Firm—Marc D. Schechter

[57] ABSTRACT

A thermomagnetooptical memory device comprises a recording medium having a substrate on which there is a magnetooptically active layer. The magnetooptically active layer is present between a laser source and a layer reflecting radiation from the laser source. The device further includes lenses to focus radiation from the laser source onto selected locations on the recording medium, and magnetooptical detectors placed in the path of the radiation returning from the magnetooptically active layer. The magnetooptically active layer comprises a polycrystalline, oxidic material based on $Fe^{3+}$ having a spinel structure and having a thickness chosen to cause destructive interference between the plane polarized radiation returning from the surface of the magnetooptic layer and plane polarized radiation returning from the reflecting layer and having passed through the magnetooptically active layer at least twice.

15 Claims, 8 Drawing Figures

THERMO-MAGNETO-OPTICAL MEMORY DEVICE AND RECORDING MEDIUM THEREFOR

This is a continuation of application Ser. No. 443,007 filed Nov. 19, 1982, and now abandoned.

FIELD OF THE INVENTION

The invention relates to a thermomagnetooptical memory device. The device comprises a recording medium having a substrate on which there is a magnetooptically active layer. The device also includes a source of laser radiation, means to focus radiation from the laser source onto selected locations on the recording medium, and magnetooptical detection means placed in the path of radiation returning from the magnetooptically active layer. The detection means comprises a polarization optical system and a photoelectric detector.

The invention also relates to a recording medium for such a device.

BACKGROUND OF THE INVENTION

It is known that materials such as MnBi, MnAlGe, GdFe, TbFe and GdCo may be used in a recording medium, for example a magnetooptical disk, for use in an optical recording system. These materials are usually deposited or sputtered in a vacuum on a glass substrate, a silicon plate or the like in order to provide a thin film for magnetooptical recording medium. Magnetooptical recording media having the following properties in common:

1. the easy axis of magnetization is perpendicular to the surface of the film, and
2. their magnetic transition temperature (Curie temperature and compensation temperature, respectively) are comparatively low.

Since the easy axis of magnetization is in a direction perpendicular to the surface of the film, binary information can be recorded in the form of "1"s and "0"s represented by locations in the film magnetized upwardly or downwardly. Hence the device may be used as a digital memory.

A method of thermomagnetically recording information, known as Curie point writing, may be carried out as follows. First, the whole film is magnetized in the downward direction or is set at "0". When the information "1" is to be recorded, a laser beam is directed onto the location at which the information is to be stored while simultaneously applying an upwardly directed external magnetic field. After the irradiated location is heated to a temperature near the Curie temperature by the laser energy, the magnetization of the external field is "trapped" upon cooling. the magnetization of the irradiated location remains upwardly directed so that the information "1" is recorded.

When the information "0" is to be recorded, the laser beam is not used because all locations on the film are initially magnetized "0". When a location which is not irradiated by the laser beam is kept at a temperature sufficiently below the Curie temperature or has a sufficiently large coercive force $H_c$, its direction of magnetization will not be reversed by applying an external magnetic field, so that the downward magnetization (information "0") is maintained.

When the recorded information is read, a plane polarized light beam is used to scan the recording medium. Depending on whether the magnetization in a scanned location (bit) is directed "up" or "down", the plane of polarization of the reflected beam is rotated in one or in the other direction (so-called magnetooptical reading).

In order to make use of the present thermomagnetic recording systems with magnetooptical reading attractive, certain conditions should be satisfied both as regards writing and as regards reading.

In order to obtain a sufficient signal-to-noise ratio, the magnetooptical figure of merit, which depends on the magnetooptical angle of rotation and the absorption coefficient, must be as large as possible. When the above-mentioned metallic magnetooptical materials are used, the magnetooptical figure of merit in reflection is comparatively low, however, because the magnetooptical rotation in reflection (the Kerr rotation) is comparatively small. The magnetooptical figure of merit in transmission is also small because the absorption is high.

A higher magnetooptical figure of merit can be obtained by using magnetooptical material based on garnet, which in transmission in a given wavelength range exhibit very high Faraday rotations in combination with low absorptions. However, as a result of such low absorption, this kind of material has difficulty in the writing process. The low optical absorption results in a poor coupling of light in the film, i.e. the energy absorption is small. As a result, in order to heat the layer to the Curie temperature, much more laser power is necessary than is the case with metallic layers of comparable thicknesses. Although the coupling can be increased by making the layer thicker, very small bits cannot be written in thick layers. In that case the recording density is reduced.

SUMMARY OF THE INVENTION

It is the object of the invention to provide a thermomagnetooptical memory device in having a high signal-to-noise ratio in reading and having a high recording density with high efficiency in writing.

According to the invention a thermomagnetooptical memory device has a magnetooptically active layer arranged between a laser source and a layer reflecting radiation from the laser source. The magnetooptically active layer comprises a polycrystalline, $Fe^{3+}$-based, oxidic material with a spinel structure. The magnetooptically active layer has a thickness in which destructive interference occurs between the plane-polarized laser radiation returning from the surface of the magnetooptical layer and that returning from the surface of the reflecting layer (the latter radiation having passed the active layer at least twice).

Layers of oxidic ferromagnetic materials having an iron basis with a spinel structure, for example magnetite ($Fe_3O_4$) and in particular, substituted or non-substituted cobalt ferrite ($Co_xFe_{3-x}O_4$), in themselves do not exhibit particularly large magnetooptical Faraday effects or Kerr effects. As a result, they do not seem to be suitable for increasing the signal-to-noise ratio of a magnetooptical system. However, it has proved possible, on the basis of the specific absorption coefficient in a specific wavelength range, to design an optical layer system with these layers which, as regards reading properties, is much superior to systems with metallic films and, as regards writing properties, is much superior to systems with garnet films.

The thickness of the magnetooptically active layer which is placed between the light source and the reflecting layer and which consists of an oxidic polycrystalline material based on iron must be chosen such that the destructive interference occurs for reflected radiation with the wavelength of light emitted by the laser. This means that the light reflected directly at the front face of the magnetooptic layer is in opposite phase with the light returning through the magnetooptic layer via the reflecting layer.

This effect occurs in a number of thicknesses of the magnetooptically active layers, which thicknesses are specific for the material. However, with increasing values of these thicknesses, the magnetooptical rotation increases but the reflection decreases. This requires a compromise which determines the layer thickness to be used in a system. On the one hand, the writing process demands a coupling of the light which is as efficient as possible, hence a reflection which is as low as possible. On the other hand the reading process requires that the signal not become too weak and hence a lower limit—dependent on the system—is imposed on the intensity of the reflected light. For a practical case this lower limit is, for example, 10% of the intensity of the incident light.

A laser which is excellently suited for use in the present invention is the AlGaAs laser which emits radiation in the wavelength range from 730–870 nm. Optionally, a He-Ne laser operating in a range around 680 nm may also be considered.

On the basis of their favourable absorption coefficients in the wavelength range from 400–900 nm, the above-described optimization is possible with oxidic, $Fe^{3+}$-based materials having a spinel structure, for example magnetite and cobalt ferrite. This optimization is not possible with garnet-based materials which have too low an absorption, nor with metallic materials which have too high an absorption.

The reflecting layer may be a multilayer dielectric (dichroic mirror) consisting of $\frac{1}{4}\lambda$ thick layers of alternately high and low refractive indices, or a metal layer (for example of Ag, Al or Au).

In the case of a metallic reflecting layer, upon thermomagnetic writing, thermoconductivity to and through the metal layer may prevent the writing of sufficiently small bits with sufficiently small power. Accordingly, in a preferred embodiment of the device according to the invention, a thermally insulating layer of dielectric material, which is transparent to radiation of the laser source, is present between the magnetooptically active layer and the reflective layer. This dielectric material has an optical thickness, nd, which is equal to $N/2 \times \lambda$, where N is an integer, $\lambda$ is the wavelength of the radiation of the laser source, n is the refractive index of the material of the dielectric layer and d is the thickness of the dielectric layer. The thickness of the thermally insulating layer, which increases the writing sensitivity, is such that the destructive interference resulting from the magnetooptically active layer is not disturbed.

The essence of the above-described measures is that when one laser source (hence one wavelength) is used for both the writing process and the reading process, the reading signal and the writing sensitivity are both increased as compared with that of conventional magnetooptical systems.

The dielectric intermediate layer may also increase the optical quality of the system of layers, in addition to reducing heat loss. When the polycrystalline magnetooptically active layer has a granular structure (which is more likely to be the case when the layer is provided by means of a spraying method than when the layer is provided by means of a sputtering process), the provision thereon of a smooth dielectric layer (preferably of approximately the same refractive index) may reduce noise, possibly due to suppression of the granularity.

By providing a dielectric material of suitable surface tension on the magnetooptically active layer via a spinning process, the top of this dielectric layer, on which the reflective layer will be provided in a subsequent stage, may become very smooth. As a result, the occurrence of scattering phenomena at the reflecting layer is avoided as much as possible. Materials suitable for the intermediate layer from the standpoint of spinnability are polymerized synthetic resins, for example, epoxy resins, phenol resins, polycarbonate resins, polyimide resins and polyacrylate resins.

When the refractive index of the dielectric material is as nearly equal to that of the magnetooptically active material as possible, little reflection will occur at the "rough" surface of the magnetooptically active layer. As a result, noise is suppressed. From the standpoint of suitable refractive indices, CeO ($n \sim 2.7$) and ZnS ($n \sim 2.4$) are possible materials for forming the dielectric intermediate layer in combination with a magnetooptically active layer of cobalt ferrite ($n \sim 2.7$).

The invention relates in particular to a thermo-magneto-optical memory device as described above having a recording medium in the form of a rotatable disk.

DETAILED DESCRIPTION OF THE PREFERRED EMBODIMENT

Figure 1:
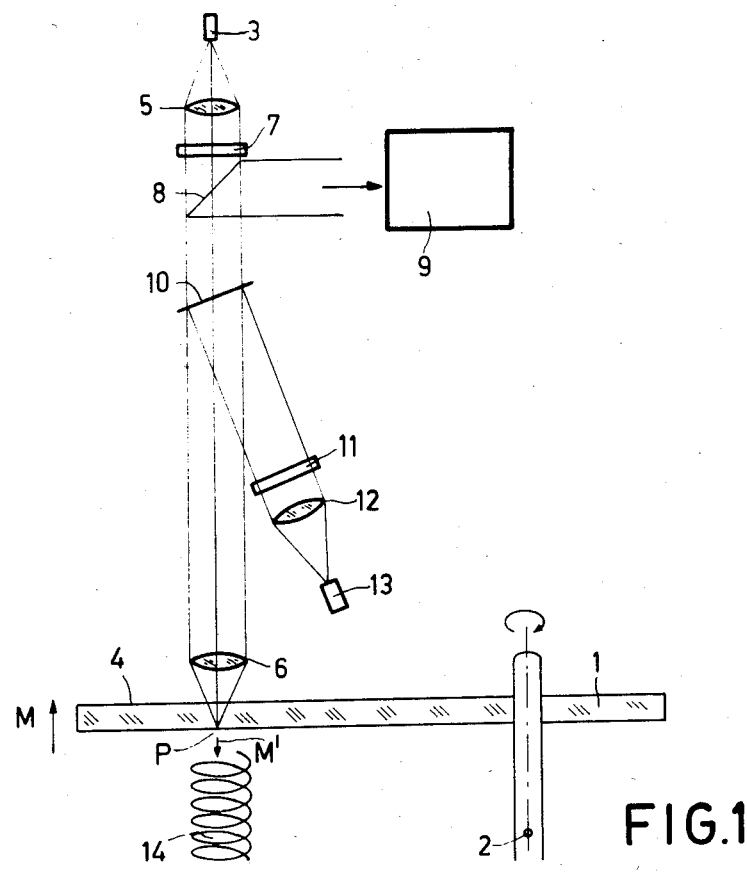
FIG. 1 schematically shows a thermo-magneto-optical recording system.

FIG. 1 schematically shows a thermo-magneto-optical recording system having a recording medium 1 which is rotatable about an axis 2. A laser source 3 is arranged at some distance above the surface 4 of recording medium 1. Laser source 3 is, for example, an AlGaAs diode laser which can emit light of a wavelength in the range between 730 and 870 nm. A characteristic wavelength is 780 nm. Such lasers are small and are suitable for being arranged so as to be movable (for example radially) with respect to the recording medium.

The light of laser source 3 is focused by means of a system of lenses 5 and 6 on point P of recording medium 1. Placed in the light path are a polarizer 7 (at least in the reading process), as well as a semipermeable mirror 8 (T=90%). Mirror 8 directs a part of the light from source 3 to a detection device 9 for controlling the correct focusing of the laser beam. A semipermeable mirror 10 (T=75%) is also placed in the light path for directing a part of the light from recording medium 1 to an analyzer 11, a lens 12, and a photoelectric detector 13 (for example, a Si avalanche detector).

In the writing process, focused radiation from laser source 3 is used to heat a selected information location (i.e., bit) in magnetooptically active layer 16 (see FIG. 2) of recording medium 1 (which layer was previously magnetized in the direction M) to a temperature near the Curie temperature of layer 16. The Curie temperature of unsubstituted cobalt ferrite is, for example, approximately 520° C. This increase in temperature together with the energization of coil 14, by means of which a counterfield M' on the order of 1000 Oe is generated, is sufficient to reverse the magnetization of the irradiated information location (i.e., bit) upon cooling.

The reading process takes place by means of the same laser source 3 with reduced power. The plane of polarization of the plane-polarized light beam incident on the recording medium 1 has rotated a certain angle after reflection. Depending on the presence of a "0" or a "1", this rotation is converted into an intensity difference by means of the analyzer 11 arranged in front of the photodiode 13. In order to obtain a combination of low writing power with maximum magnetooptical effect, the recording medium 1 according to the invention is constructed from a magnetooptically active layer having a very specific composition and thickness which is combined with a reflecting layer.

The magnetooptically active layer 16 is provided on a nonmagnetic substrate 15, which may, for example, be made of amorphous $SiO_2$. Within the scope of the invention, the layer 16 consists of a polycrystalline oxidic material having a basis of Fe and a spinel structure, for example $Fe_3O_4$ or $Co_xFe_{3-x}O_4$. Materials of the $Co_xFe_{3-x}O_4$-type (cobalt ferrite) will be described hereinafter by way of example.

The present polycrystalline materials can be provided with sufficiently large perpendicular magnetic anisotropy on an area which is sufficiently large for purposes of the present invention, in particular by means of a spraying process. This is in contrast with, for example (monocrystalline) garnet materials. Moreover, at the wavelengths in use (730–870 nm) their absorption is very favorable with regard to both the writing process and the reading process.

The thickness d of layer 16 is accurately matched to the wavelength of the laser source 3 used and the absorption of the material making up layer 16 so as to obtain destructive interference between the beam 19a (reflected at the interface between substrate 15 and magnetooptic layer 16) and the beams 20, 21, 22, and so on (returning after reflection from a (metallic) reflecting layer 18). As a result of the absorption in the layer 16, the reflection ($\neq 1$) at the layer 18, and the reflection at the interface between layers 15 and 16, the intensities of the light beams become gradually weaker.

A thermally insulating dielectric layer 17, which is transparent to the laser light used and has a thickness d' which does not disturb the destructive interference, is present between the layers 16 and 18.

With the construction shown, the light is incident via the substrate 15 on the magnetooptically active layer 16. However, the construction may also be such that the light is incident directly on the magnetooptically active layer. In that case the reflecting layer is present between the substrate and the magnetooptically active layer.

For unsubstituted cobalt ferrite and an incident light beam having a wavelength $\lambda = 780$ nm, d should preferably be approximately 0.22 μm. The reason for this will be explained with reference to FIG. 3. FIG. 3 shows that with a layer system like that shown in FIG. 2 in which layer 16 is made of $CoFe_2O_4$, the double magnetooptical rotation 2O depends on the thickness d and on whether destructive or nondestructive interference occurs. This appears from the fact that disregarding interference effects, one would expect the rotation to be two times the Faraday rotation (1.6° for a layer thickness of 0.22 μm). However, as a result of the destructive interference, a rotation of 3.8° is measured.

A local maximum of 2O=3.8° occurs with d=0.22 μm and a local maximum of 2O=8° occurs with d=0.37 μm. These maxima in the rotation are associated with reflection minima. With d=0.22 μm, the reflection coefficient R is 20%, and with d=0.37 μm, R is 6%. It has been found that the most favorable compromise occurs when the layer 16 in the present case has a thickness of approximately 0.22 μm. So FIG. 3 shows that, depending on the desired reflection coefficient, the thickness may be chosen for which the rotation 2O is locally maximum.

Figure 4:
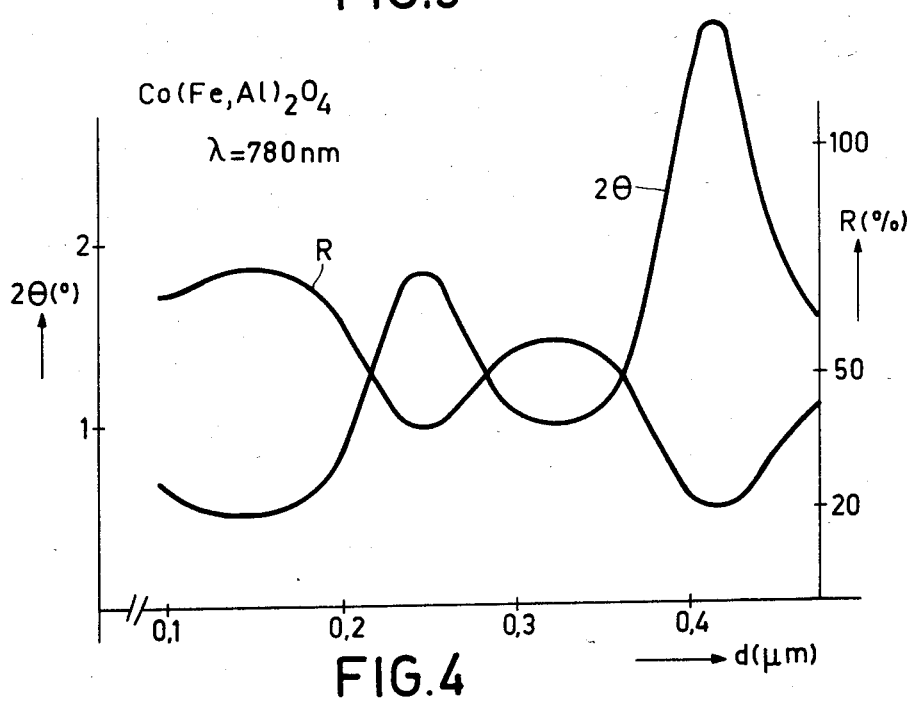

The situation is quite different for a material having optical constants different than those of the unsubstituted cobalt ferrite described above. FIG. 4 shows that for a layer system having a magnetooptic layer of $CoFe_{1.4}Al_{0.6}O_4$ ($Al^{3+}$ is substituted for $Fe^{3+}$ to reduce the Curie temperature), rotation maxima occur with thicknesses d=0.24 μm (2O=1.85°) and d=0.41 μm (2O=3.2°). The associated reflection minima are 40% and 20%, respectively.

Figure 2:
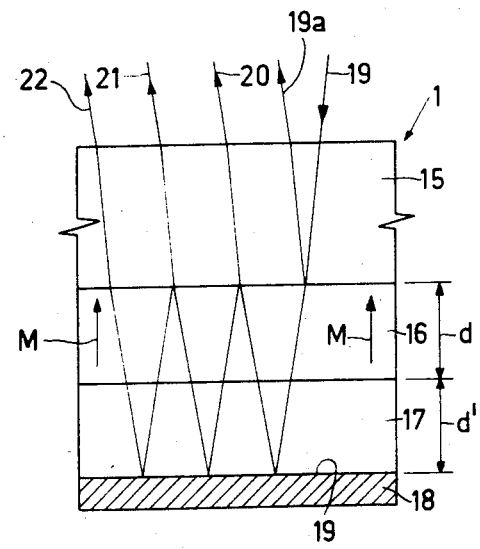
FIG. 2 is a cross-sectional view through a recording medium for a thermo-magneto-optical recording system according to the invention.
Figure 3:
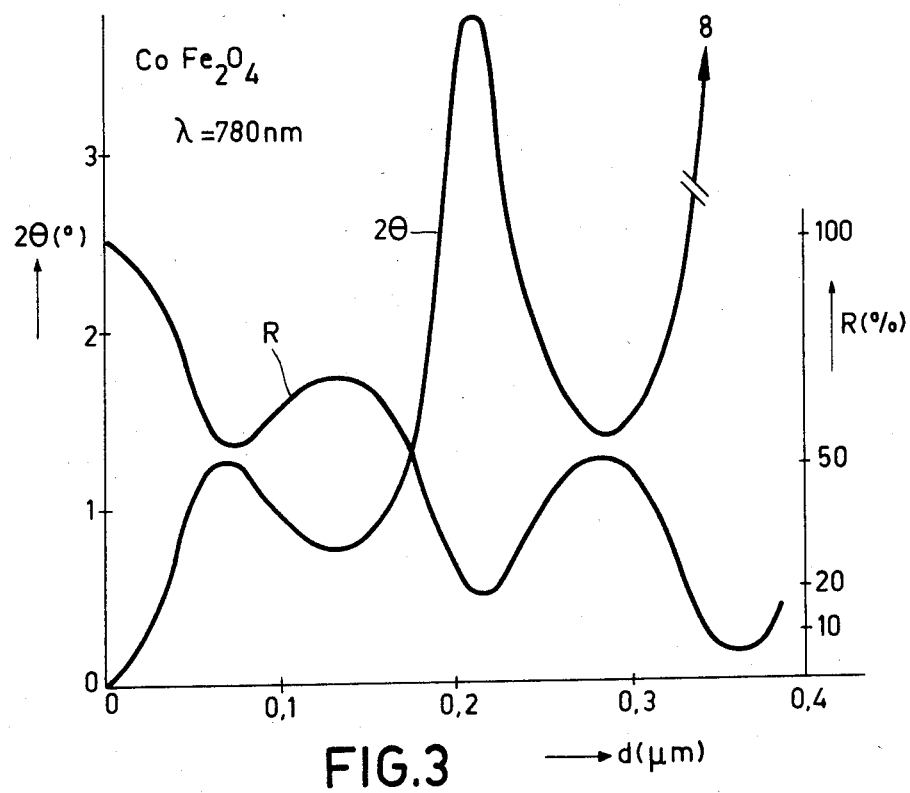
FIGS. 3 and 4 are graphs showing the double magnetooptical rotation 2O (in degrees) and the reflection coefficient R (in %), of a recording medium of the type according to FIG. 2, as a function of the thickness of the magnetooptically active layer thereof, for two compositions.

Referring to FIG. 2, it is to be noted that when reflective layer 18 is a metallic material (for example Al, Ag or Au), the presence of a dielectric thermally-insulating intermediate layer 17 reduces the laser energy necessary for writing at locations of, for example 1 μm in diameter. The thickness d' of the thermally insulating layer 17 should be such that the destructive interference between the rays 19a, 20, 21 and 22 is not disturbed. When the layer 17 consists of $SiO_2$, d' in the above-mentioned example (where layer 16 is unsubstituted cobalt ferrite, $\lambda = 780$ nm, d=0.22 μm) should be approximately 0.26 μm or a multiple thereof. The thickness of the (metallic) reflecting layer 18 is at least 500 Å.

Providing a layer 17 on layer 16, even when layer 18 is not metallic, may also be advantageous to obtain a smooth surface 19 on which the reflecting layer 18 can be provided. The smoother the surface 19, the less noise will be produced.

Whether or not layer 17 is spun, a material may be used for the layer 17 which has a refractive index n which corresponds as nearly as possible to that of the material of the layer 16. (Cobalt ferrite, for example, has a refractive index n~2.7 at a wavelength $\lambda = 800$ nm).

Figure 5:
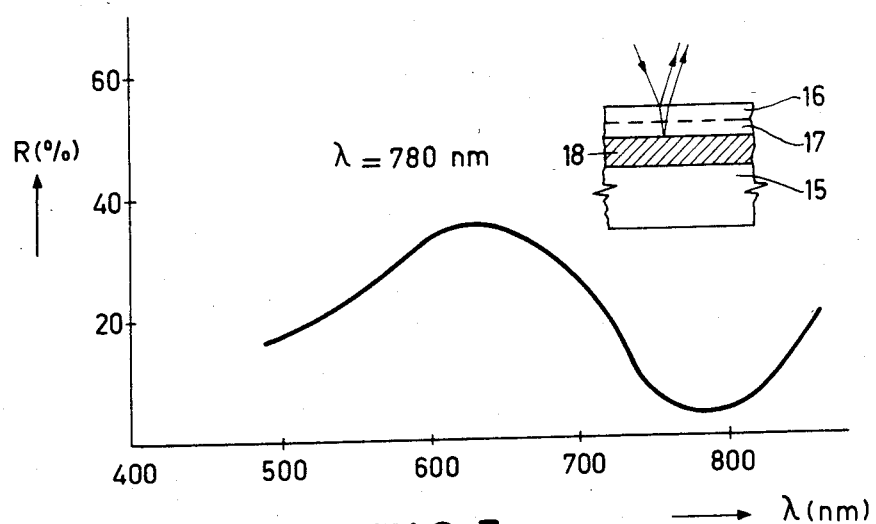
FIG. 5 is a graph showing the reflection spectrum and FIG. 6 is a graph showing the rotation spectrum of a recording medium optimized for use with a laser source of 780 nm.
Figure 6:
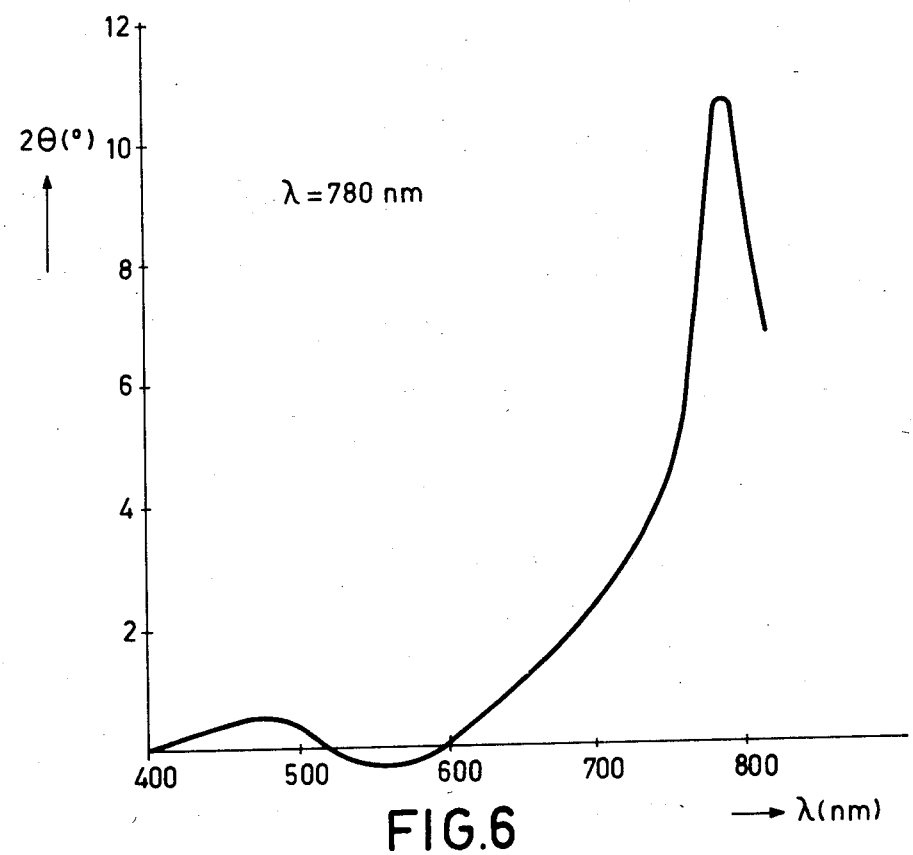

FIG. 5 graphically shows an example of the reflection spectrum and FIG. 6 graphically shows the rotation spectrum of a layer system with a $CoFe_2O_4$ magnetooptic layer. The thickness of the $CoFe_2O_4$ layer is optimized for a wavelength $\lambda = 780$ nm. It will be apparent that both the reflection spectrum (minimum) and the rotation spectrum (maximum) show extremes at $\lambda = 780$ nm. Therefore, if such a system were to be used in combination with a laser source emitting light having a wavelength deviating from 780 nm, optimization is not attained. The spectra in FIGS. 5 and 6 were measured with light directly incident on the magnetooptically active layer 16. As shown in FIG. 5, the reflector 18 was placed between the substrate 15 and the layer 16.

Figure 7:
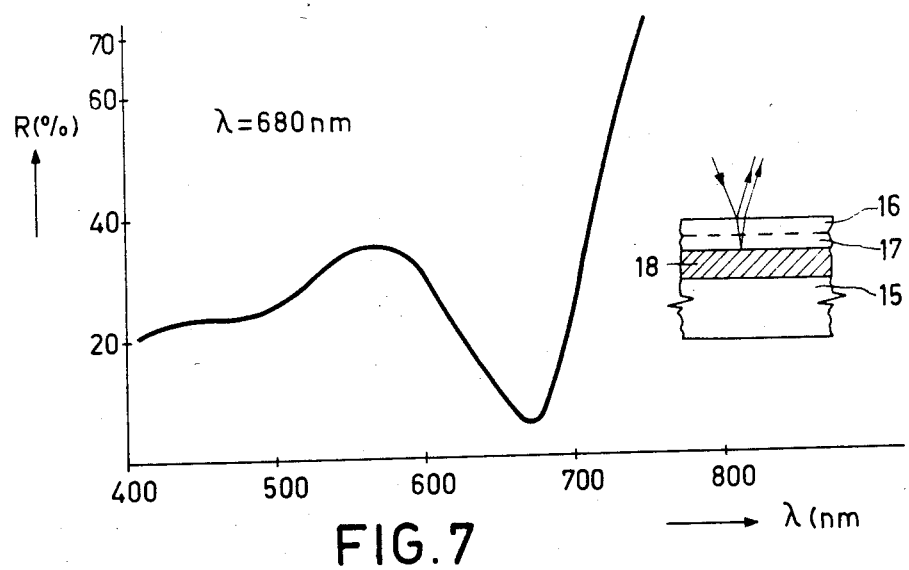
FIG. 7 is a graph showing the reflection spectrum and FIG. 8 is a graph showing the rotation spectrum of a recording medium optimized for use with a laser source of 680 nm.
Figure 8:
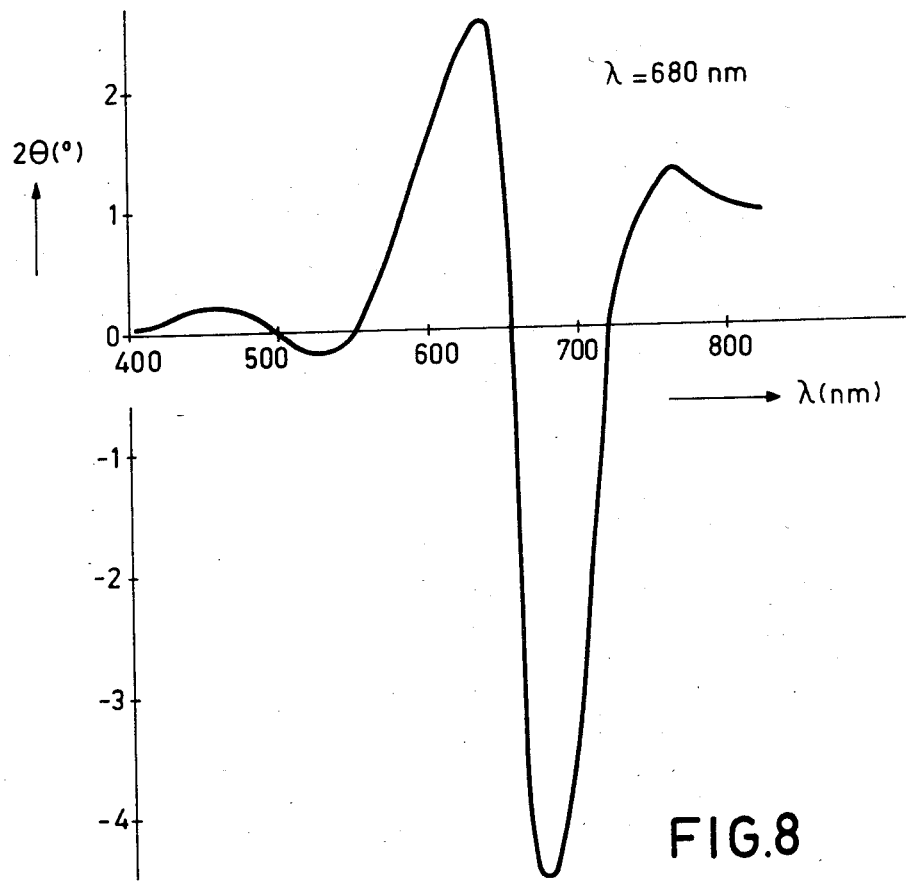

FIG. 7 graphically shows an example of the reflection spectrum and FIG. 8 graphically shows an example of the rotation spectrum of a layer system having a $CoFe_2O_4$ magnetooptic layer. The thickness of the $CoFe_2O_4$ layer is optimized for a wavelength $\lambda = 680$ nm. In this case, also, the extremes of the spectra, which were also measured with light directly incident on the magnetooptically active layer 16, are prominent.

It is to be noted that other ions may be substituted for the $Fe^{3+}$ ions of $Co_xFe_{3-x}O_4$ so as to reduce the Curie temperature, if necessary. To be considered are, for example, $Al^{3+}$, $Rh^{3+}$, $Mn^{3+}$ and $Cr^{3+}$. When the Curie temperature drops, however, the magnetization and hence the rotation at room temperature also decrease. If this is undesirable, instead of the above-mentioned substitutions, ($Co^{2+} + X$), where X is a quadrivalent or a pentavalent metal ion (for example, $Ti^{4+}$, $Sn^{4+}$, $Ir^{4+}$, $V^{5+}$), may be substituted. Although the magnetization at room temperature also decreases, the rotation increases slightly.

What is claimed is:

1. A thermomagnetooptical memory device comprising:
   a recording medium having a magnetooptically active layer on a substrate, said magnetooptically active layer having first and second opposite surfaces;
   means for producing a beam of laser radiation, said beam having a wavelength $\lambda$, said beam being incident on the first surface of the magnetooptically active layer;
   means for focusing the beam of laser radiation onto selected locations on the recording medium; and
   magnetooptical detection means arranged to receive laser radiation reflected from the recording medium;
   characterized in that:
   the recording medium further comprises a reflective layer for reflecting laser radiation incident thereon, said reflective layer being arranged facing the second surface of the magnetooptically active layer;
   the magnetooptically active layer consists essentially of a polycrystalline $Fe^{+3}$-based oxidic material with a spinel structure said layer having a thickness such that destructive interference is produced between laser radiation reflected at the first surface of the magnetooptically active layer and laser radiation reflected by the reflective layer, the radiation reflected by the reflective layer passing through the magnetooptically active layer twice; and
   the recording medium further comprises a thermally-insulating dielectric layer arranged between the second surface of the magnetooptically active layer and the reflective layer, said dielectric layer being transparent to radiation of wavelength $\lambda$ and having an optical thickness equal to an integral multiple of $\lambda/2$.

2. A thermomagnetooptical memory device as claimed in claim 1, characterized in that the dielectric material is provided by spinning from a liquid phase, and the dielectric material has a smooth surface on which the reflective layer is provided.

3. A thermomagnetooptical memory device as claimed in claim 2, characterized in that the dielectric material is a polymerized synthetic resin.

4. A thermomagnetooptical memory device as claimed in claim 1, characterized in that the dielectric material has a refractive index substantially equal to that of the magnetooptically active layer.

5. A thermomagnetooptical memory device as claimed in claim 1, characterized in that the $Fe^{3+}$-based oxidic material is cobalt ferrite.

6. A thermomagnetooptical memory device as claimed in claim 5, characterized in that $\lambda$ is between 730 and 870 nm.

7. A thermomagnetooptical memory device as claimed in claim 6, characterized in that the recording medium is a rotatable disc.

8. A thermomagnetooptical memory device comprising:
   a recording medium having a magnetooptically active layer on a substrate, said magnetooptically active layer having first and second opposite surfaces;
   means for producing a beam of laser radiation, said beam being incident on the first surface of the magnetooptically active layer;
   means for focusing the beam of laser radiation onto selected locations on the recording medium; and
   magnetooptical detection means arranged to receive laser radiation reflected from the recording medium;
   characterized in that:
   the recording medium further comprises a reflective layer for reflecting laser radiation incident thereon, said reflective layer being arranged facing the second surface of the magnetooptically active layer; and
   the magnetooptically active layer consists essentially of a polycrystalline $Fe^{+3}$-based oxidic material with a spinel structure said layer having a thickness such that destructive interference is produced between laser radiation reflected at the first surface of the magnetooptically active layer and laser radiation reflected by the reflective layer, the radiation reflected by the reflective layer passing through the magnetooptically active layer twice.

9. A thermomagnetooptical memory device as claimed in claim 8, characterized in that the beam of laser radiation has a wavelength between 730 and 870 nm.

10. A thermomagnetooptical memory device as claimed in claim 9, characterized in that the magnetooptically active layer has a thickness of between 50 and 500 nm.

11. A thermomagnetooptical memory device as claimed in claim 10, characterized in that the magnetooptically active layer has a thickness approximately equal to 220 nm.

12. A recording medium for thermomagnetooptically storing information, said information being recorded and read from the medium with a laser radiation beam, said medium comprising:
   a magnetooptically active layer consisting essentially of a polycrystalline $Fe^{3+}$-based oxidic material with a spinel structure, said layer having first and second opposite surfaces; and
   a reflective layer for reflecting laser radiation, said reflective layer being arranged facing the second surface of the magnetooptically active layer;

characterized in that the magnetooptically active layer has a thickness such that destructive interference is produced between laser radiation reflected at the first surface of the magnetooptically active layer and laser radiation reflected by the reflective layer, the radiation reflected by the reflective layer passing through the magnetooptically active layer twice.

13. A thermomagnetooptical memory device as claimed in claim 12, characterized in that the beam of laser radiation has a wavelength between 730 and 870 nm.

14. A recording medium as claimed in claim 13, characterized in that the magnetooptically active layer has a thickness of between 50 and 500 nm.

15. A recording medium as claimed in claim 14, characterized in that the magnetooptically active layer has a thickness approximately equal to 220 nm.

* * * * *